Aug. 29, 1939.  R. C. ZEIDLER  2,171,385
CLUTCH
Filed Oct. 7, 1937  4 Sheets-Sheet 4
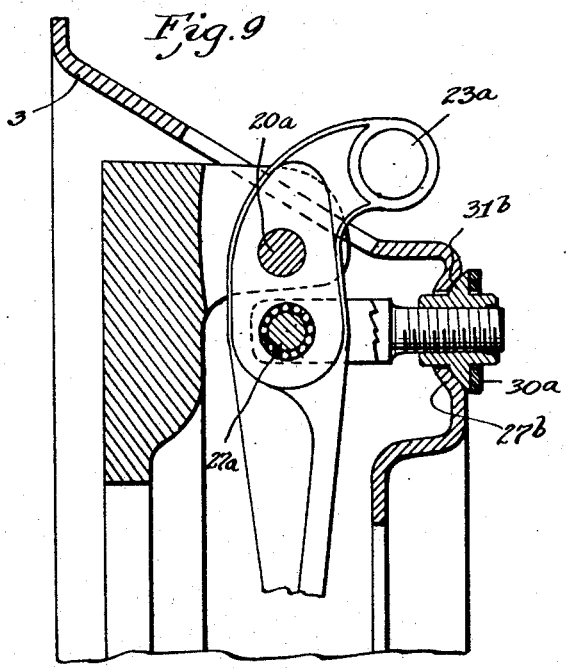
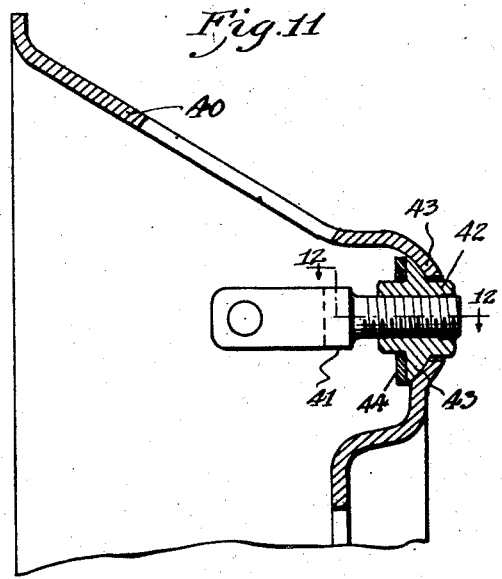
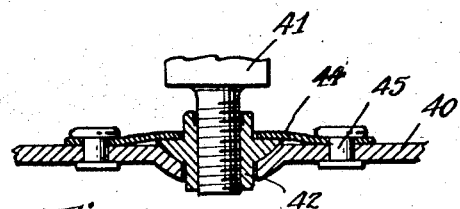
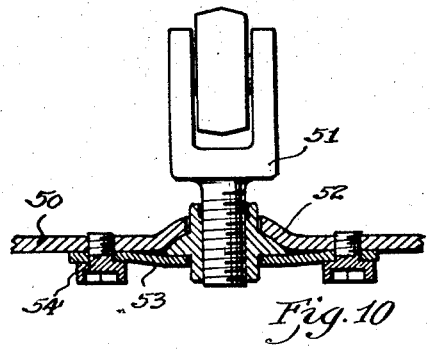
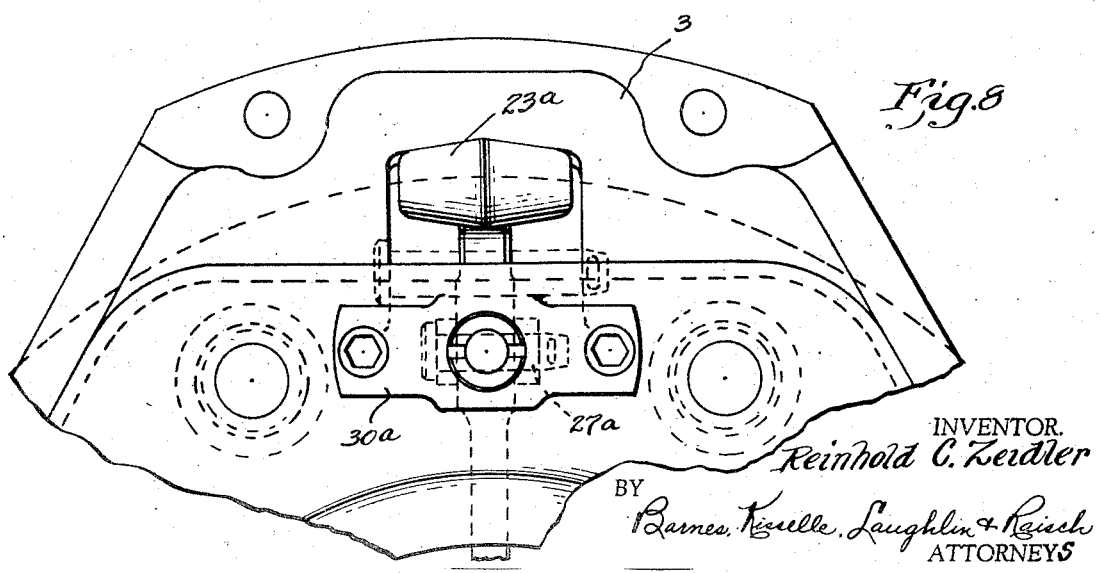
INVENTOR.
Reinhold C. Zeidler
BY
Barnes, Kisselle, Laughlin & Raisch
ATTORNEYS Patented Aug. 29, 1939

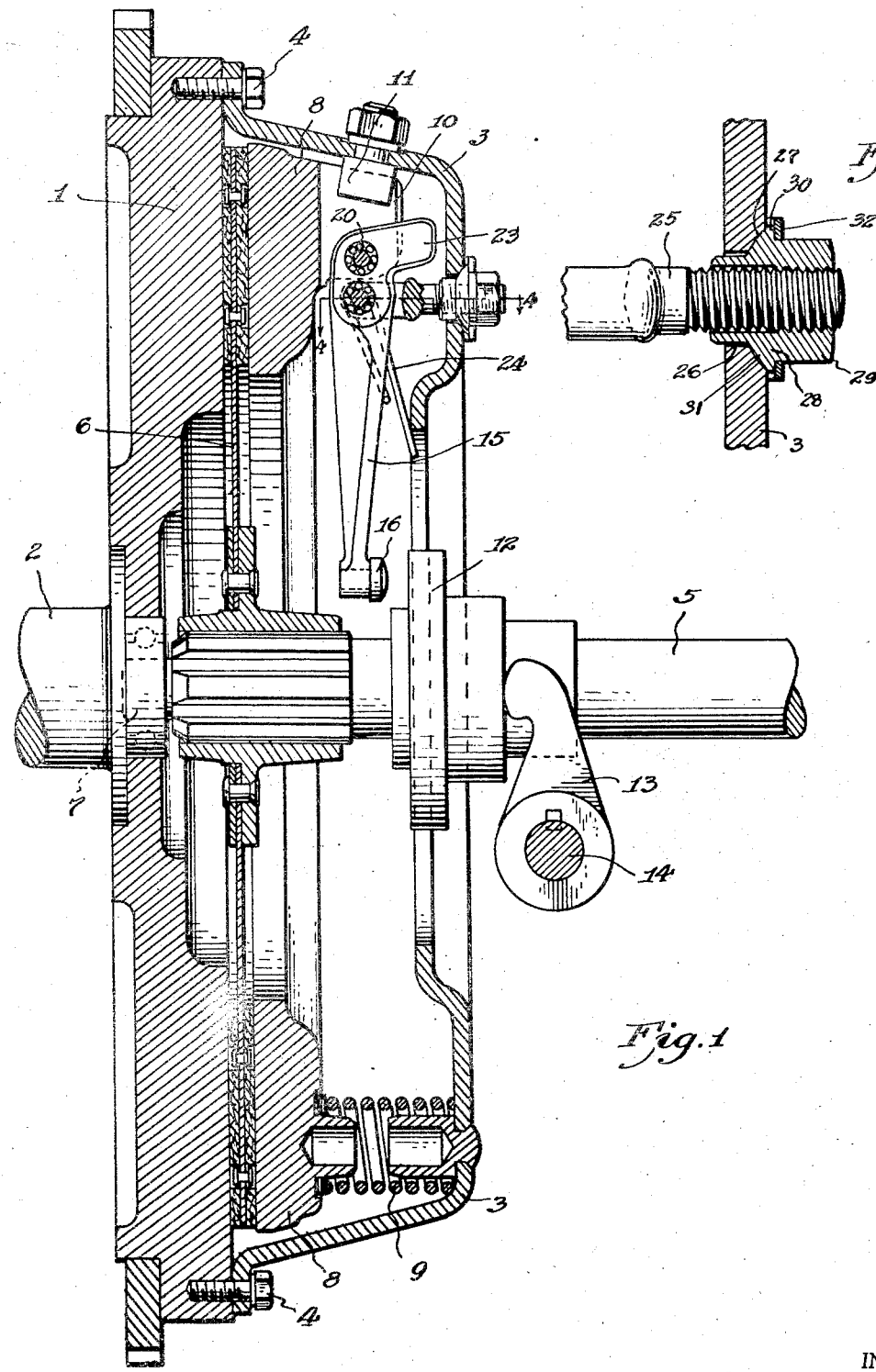

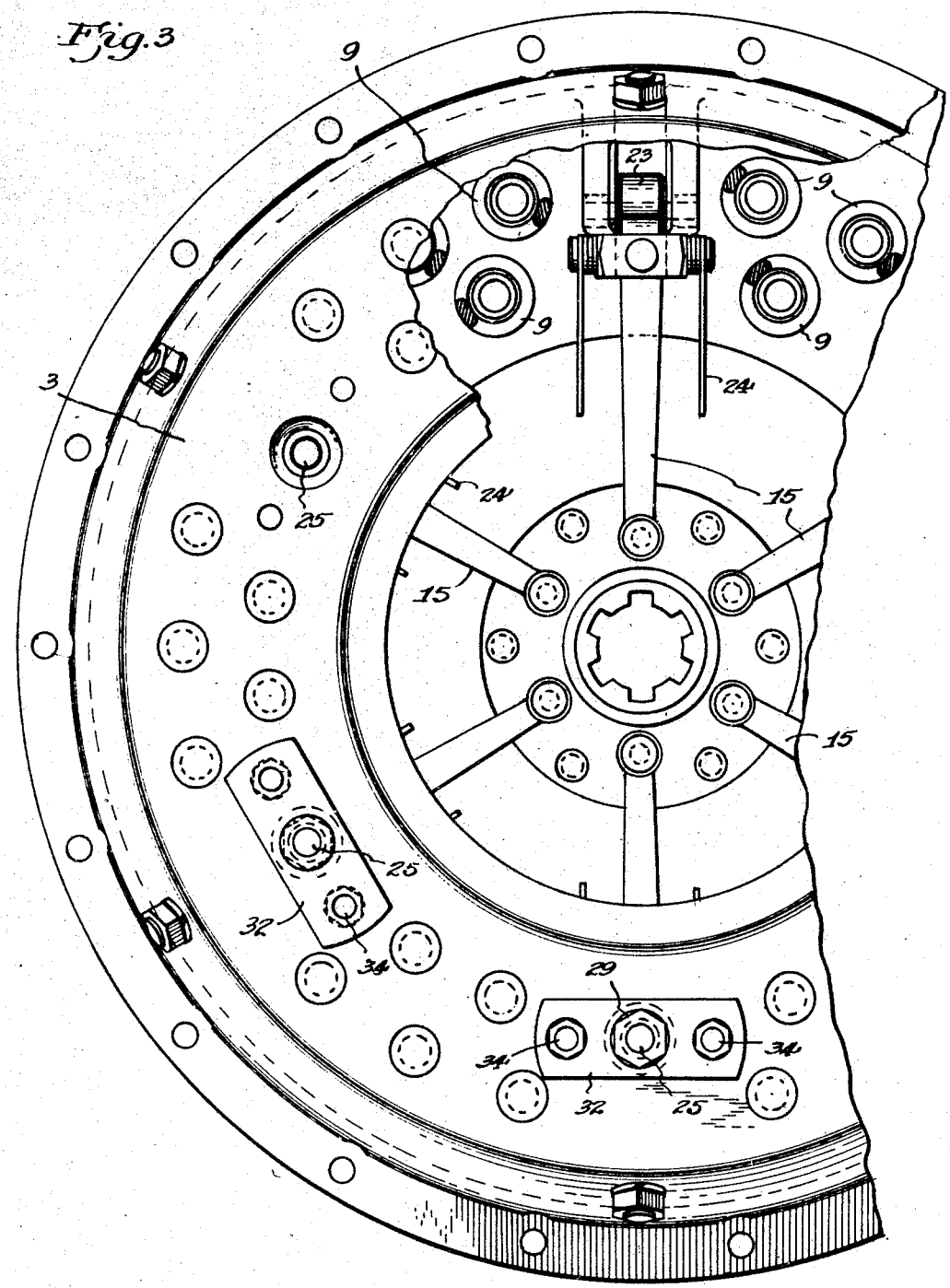

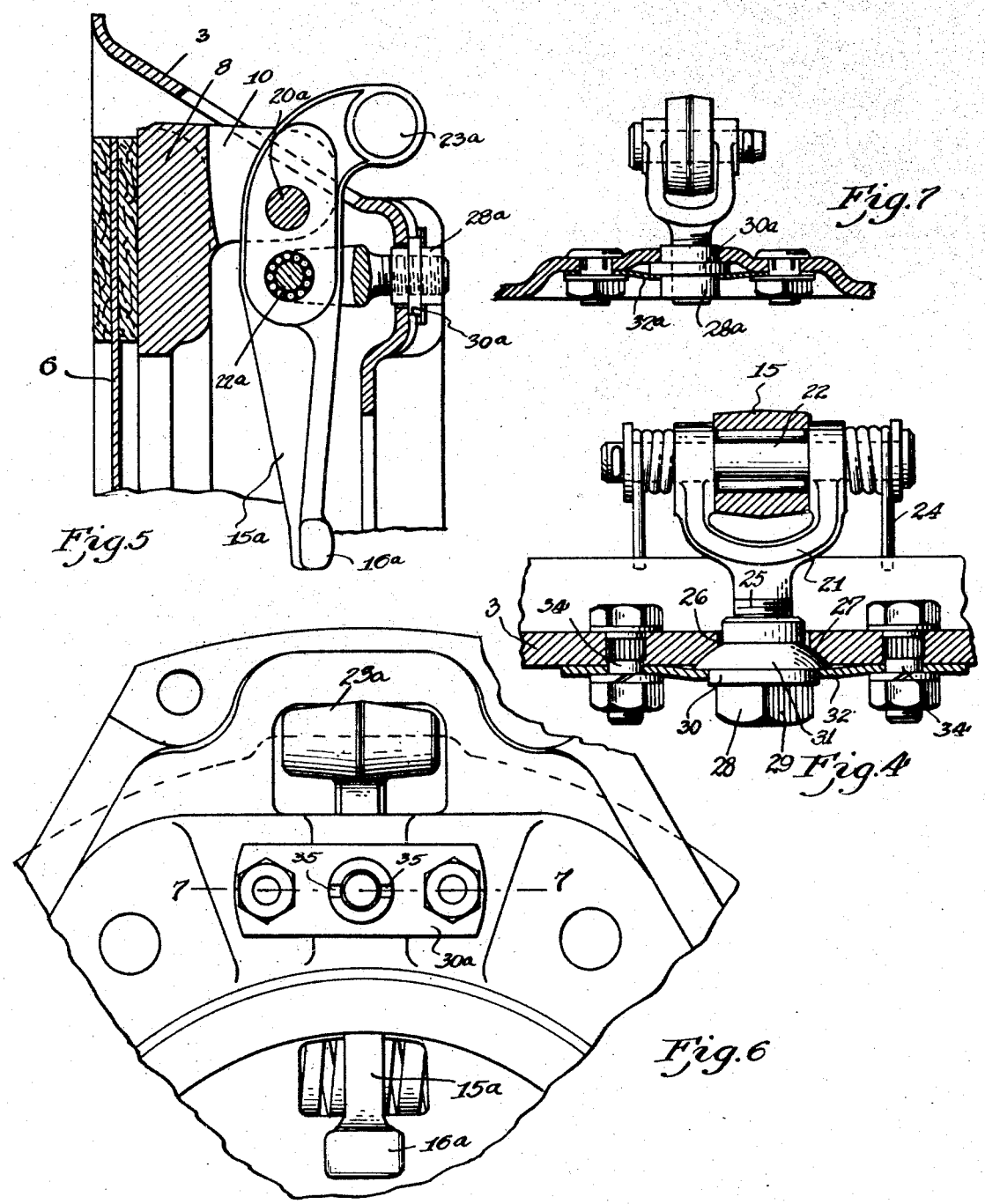

2,171,385

UNITED STATES PATENT OFFICE 2,171,385

CLUTCH

Reinhold C. Zeidler, Detroit, Mich., assignor to Borg-Warner Corporation, Chicago, Ill., a corporation of Illinois Application October 7, 1937, Serial No. 167,797

14 Claims. (Cl. 192—103)

This invention relates to a clutch, and has to do particularly with certain improvements especially useful in a clutch which employs centrifugal force as a clutch engaging factor.

Since the invention is applicable to a clutch which may be termed a semi-centrifugal clutch, the following detailed description and the drawings illustrate the invention embodied in such a clutch. The term "semi-centrifugal clutch" as used herein means a clutch which may be engaged by spring pressure and wherein the packing pressure may be supplemented or augmented by centrifugal force. In this manner the spring pressure employed may be considerably less than that used in an all spring clutch of the same capacity, thus making for ease of clutch operation at relatively low R. P. M. Such a clutch is covered in the E. E. Wemp Patent No. 2,021,973.

Among the objects of the invention are the provision of a clutch which employs centrifugal force and which is capable of adjustment in a manner similar to that of a conventional or spring clutch; one wherein there is a greater degree of adjustment and one wherein the dimensions need not be held to such close limits. To this end the invention is directed particularly to a mounting for the clutch release levers, which mounting resides in a mounting member such as a yoke and especially in the way this mounting member is mounted upon a clutch supporting member such as the cover plate. This mounting between the yoke member and cover plate is such as to have a certain degree of flexibility or articulation and yet is one which will meet and overcome forces applied in opposite directions. When the clutch is disengaged the force required to compress the clutch springs is communicated through the lever mounting in one direction; at relatively high R. P. M. the centrifugal action transmits force through the lever mounting in the opposite direction. The mounting is such as to take care of these opposite forces, while at the same time a non-rigid support is provided and in addition clutch adjustment may be made at the supports. These and other objects will become more apparent as the detailed description progresses.

In the accompanying drawings:

Fig. 1 is a cross sectional view taken through a clutch constructed in accordance with the invention and illustrating the mounting referred to.

Fig. 2 is an enlarged cross sectional view taken through the yoke mounting.

Fig. 3 is a partial rear elevational view of the clutch shown in Fig. 1.

Fig. 4 is a sectional view through the yoke mounting taken substantially on line 4—4 of Fig. 1.

Fig. 5 is a partial sectional view of a modified form of the invention.

Fig. 6 is a rear elevational view of the structure shown in Fig. 5.

Fig. 7 is a cross sectional view taken substantially on line 7—7 of Fig. 6.

Fig. 8 is a partial rear elevational view of a further arrangement.

Fig. 9 is a cross sectional view taken through the structure illustrated in Fig. 8.

Fig. 10 is a cross sectional view through the yoke mounting taken substantially on line 10—10 of Fig. 8.

Fig. 11 is a view illustrating a further modified form of the invention.

Fig. 12 is a cross sectional view similar to Fig. 11, but showing a modified arrangement for securing the locking plate to the cover plate.

Referring to Fig. 1, a clutch is shown in association with the flywheel of an engine, especially an internal combustion engine for automotive vehicles. The flywheel is illustrated at 1, mounted upon the engine crankshaft 2. A clutch cover plate is shown at 3 secured to the flywheel by cap screws 4. A driven shaft is illustrated at 5 upon which is mounted a clutch driven member 6. One end of the driven shaft may be piloted in the flywheel as at 7. The driven member is arranged to be packed between the flywheel 1 and a pressure plate 8, the flywheel and pressure plate constituting driving members. The particular clutch illustrated in this figure is a large clutch for heavy duty, such as may be used in buses or trucks. Clutch packing springs lie between the pressure plate and cover plate as illustrated at 9, and although quite a number of springs are illustrated in Fig. 3, the total pressure provided thereby may be less than that which would be necessary where centrifugal force is not employed to supplement the clutch packing pressure.

The pressure plate 8 may have slotted lugs 10 in which driving studs 11 fit, these studs being secured to the cover plate as shown. A clutch throw-out bearing is illustrated at 12 designed to be shifted by the usual fork 13 mounted upon a clutch throw-out shaft 14 which in turn may be rocked by the usual foot pedal (not shown).

There are a plurality of clutch releasing levers; six levers are shown in the present clutch and they are indicated at 15. In a heavy duty clutch of this kind the inner ends of the levers may be equipped with hardened steel contact buttons 16 which may be press fitted into the ends of the levers and are for contact with the clutch throw-out bearing 12. Each lever has a fulcrum point on a yoke and a pivotal connection with the pressure plate. The levers may lie in between the bifurcated projection 10 and may be pivotally mounted therein as by means of a bearing 20. A yoke is illustrated at 21 and each lever has a fulcrum in a yoke as illustrated at 22. The pivotal connections 20 and the fulcrum 22 may be of an anti-friction nature employing needle roller bearings as illustrated, although such bearings may be changed as to type insofar as the present invention is concerned. Each lever has an unbalanced centrifugal mass 23, the function of which will presently appear, and in a large clutch of this kind where there is ample room inside the cover plate, the weights may be disposed inside the cover plate as illustrated. An anti-rattle spring is illustrated at 24 having an intermediate portion engaging a lever, portions extending around the projecting ends of the pintle or pin forming the fulcrum, and with end portions engaging the cover plate. There may be one spring for each lever.

Each yoke member has a screw threaded stem 25 which is arranged to project into or through an aperture 26 in the cover plate. The aperture 26 may have a spherical seat portion 27. A nut 28 is screw threaded on to the stem of the yoke, this nut having a head 29 suitably formed for the reception of a wrench. An enlarged portion 30, on one side, forms an abutment and on the other side is partially spherically formed as at 31 arranged to rest upon the partially spherical seat 27. An element which may be termed a lock plate is illustrated at 32. This element is preferably of spring steel with an aperture fitting over the nut as illustrated in Fig. 4 for which purpose the nut may have a circular part 33 so that the nut may turn thereon. The lock plate is secured to the cover plate preferably at opposite ends by means such as bolts 34. The proportions and dimensions of the partially spherical seat and the enlargement 30 is such that the shoulder formed thereby projects beyond the plane of the adjacent portion of the cover plate. Accordingly when the ends of the lock plate are bolted down tight to the cover plate, the lock plate is flexed or sprung as shown in Fig. 4.

In the operation of this clutch the same is disengaged by the shifting of the throw-out bearing to the left, thus rocking the levers; the lever illustrated in Fig. 1 rocks clockwise around its fulcrum and the pressure plate is shifted away from the flywheel, and the driven disc thus disengaged. At this time the yokes are under tension and the force is overcome by the ball and socket type of seat between the cover plate and the enlargement on the nut. The pressure plate is, of course, a rigid affair and the pivotal points 20 must shift in a straight line. This may cause a rocking of the yokes which is permitted by the rocking of the ball and socket type of seats for the yokes. Any such rocking, however, must take place against the action of the spring lock plates and the lock plates are sufficiently flexible for this purpose. The movement, however, is ordinarily very slight. When the clutch is in operation the unbalanced centrifugal masses 23 tend to swing outwardly and the force creates a packing pressure urging the pressure plate 8 against the driven disc with increased pressure. This action places the yokes under compression and the spring plates are of such design and strength as to resist this force.

With this arrangement the clutch may be adjusted by turning the nuts 28 on the yokes. Thus by properly adjusting the nuts the inner ends of the levers may be brought into a common plane for simultaneous engagement by the clutch throw-out bearing. Accordingly a mounting is provided by means of which the clutch may be adjusted at the yoke mounting and yet the mounting is such as to take forces in opposite directions and at the same time provide for adequate relative movement, where such movement is necessary. The spring lock plates engage the nuts with pressure and this has been found to be sufficient to hold the parts locked in adjustment so that no additional locking means or locking washers are needed. Moreover, the dimensions of parts need not be held so closely since the structure provides for a wide range of adjustment, and moreover this adjustment is of the conventional type.

A modified form of mounting is shown in Figs. 5, 6 and 7. The particular clutch shown here is one such as may be used on a passenger vehicle, although the mounting illustrated is not limited to use with clutches for passenger vehicle use. Such parts as the driven member, pressure plate and cover plate carry reference characters which are the same as in the preceding form. The clutch release levers, one of which is shown at 15a, are fulcrumed as at 22a and pivoted to the pressure plate as at 20a. The bifurcated projection 10 extends out through slots in the cover plate for the driving action, while the unbalanced centrifugal masses are outside the cover plate as illustrated at 23a. In this form the nut 28a which is screw threaded on to the stem of the yoke is provided with a circumferential enlargement 30a of a square faced arrangement adapted to abut directly against the flat surface of the cover plate. The lock plate is illustrated at 32a. This form varies principally in the elimination of the spherical seat, but the action is otherwise the same. Any lateral movement of the yoke with respect to its mounting takes place by a slight cocking action of the enlargement 30a on the cover plate flexing the lock plate. The cocking action is quite small and it has been found in some instances that the structure of this modification will function satisfactorily without the ball and socket type of seat. Also in this form the head of the nut has opposite slots 35 for the reception of a different type of wrench. The inner ends of the levers, as illustrated at 16a, are not equipped with the hardened steel inserts.

In Figs. 8 and 9 a clutch structure is illustrated similar to that shown in Figs. 5, 6 and 7, except that in this form the cover plate is depressed as at 27b to form a partially spherical seat for the reception of the partially spherical portion of nut 31b. The reference characters in these views are otherwise the same as the characters used in Figs. 5, 6 and 7. This form also varies over the form in Fig. 1, as the cover plate is formed with a depressed portion which may be obtained from a stamping process, whereas the partially spherical seat illustrated in Fig. 1 may be obtained by a machining operation.

In Figs. 11 and 12 an arrangement is shown wherein the locking plate is on the inside of the cover plate. In these views the cover plate is illustrated at 40 and the yoke at 41. The nut 42 is inside the cover plate but has a portion extending through the aperture in the cover plate sufficiently far for the reception of a wrench for adjusting purposes. The enlarged portion 43 has a partially spherical surface seating in partial seat 43 in the cover plate, while the locking plate 44 is on the inside of the cover plate. The disposition of the locking plate inside the cover plate is not dependent upon the use of a ball and a socket type seat, although this type of seat is shown in this form of the invention. The locking plate is shown as attached to the cover plate by rivets 45.

This form of the invention has some advantages. The clutch is only released a small part of the time and the locking plate takes the forces communicated to the mounting when the same is released. The centrifugal force places the yoke under compression and therefore all the time the clutch is operating these forces are taken by the nut seating on the cover plate. This form of the invention also has the advantage of compensating for an inaccurate adjustment of the levers. Suppose, for example, the inner end of one lever is not quite in plane with the other levers so that the throw-out bearing strikes this one lever first. The tension on the yoke will cause the spring locking plate to flex so that there will be no clutch disengagement until the high lever is pushed into the plane of the other levers. Then clutch disengagement may continue rocking all the levers simultaneously. Thus the pressure plate may be retracted evenly and squarely even though there may be a slight disalignment of the levers at their inner ends. The placing of the locking plates inside the cover plate, however, has disadvantages so far as clutch assembly is concerned. Where the locking plate is outside the cover plate, the clutch may be assembled in a normal manner and the locking plates are the last things to go on. Where the locking plates are on the inside, the adjusting nut and locking plate are previously assembled with the cover plate. The nuts have to be turned to screw thread them on to the yoke in assembling the cover plate. Then after the screw threads are engaged the cover plate may be moved down the rest of the way and then the proper lever adjustment may be made.

In the operation of the clutch the pivotal connection between the levers and the pressure plate resists centrifugal forces of the levers as a whole as well also as the yokes. Accordingly, these centrifugal forces do not place a load upon the yoke mounting, at least to any substantial degree.

It has been found that self-threading screws may be used for the locking plate either inside or outside the cover plate, as illustrated in Fig. 10. In this figure the cover plate is illustrated at 50, the yoke at 51, the ball and socket type seat at 52 and the spring locking plate at 53. The cover plate is usually of mild steel, the same being a stamping, and the same may be provided with non-threaded apertures. The screw members 54 may be passed through apertures in the locking plate and then threaded into the cover plate, with the screws cutting their own threads in the apertures of the cover plate as they turned into position. This self-threading screw may be used in any of the various forms of the invention.

I claim:

1. A clutch comprising in combination driving and driven members, clutch releasing levers having unbalanced centrifugal masses for exerting clutch packing pressure by centrifugal force, a support for each lever for resisting clutch releasing forces and for resisting forces of clutch packing pressure exerted centrifugally by said masses, comprising a member seated upon a fixed clutch member with the seat resisting some of said forces exerted on the support in one direction, and means including a spring element holding said member seated upon the fixed clutch member, said spring element being of such strength as to resist other of said forces exerted on the support in the opposite direction and which tend to unseat said member.

2. A clutch comprising in combination driving and driven members, clutch release levers, a support for each lever comprising a member seated upon a fixed clutch member for resisting forces in one direction and means including a spring element frictionally engaging and holding said member seated upon the fixed clutch member, said spring element being of such strength as to resist forces in the opposite direction tending to unseat said member, said member arranged to rock upon said seat.

3. A clutch comprising in combination driving and driven members, clutch release levers, a support for each lever, a seat member adjustably secured to each support and arranged to seat upon a fixed member of the clutch, said seat member being accessible so that it may be manipulated for adjustment relative to the support, and spring means engaging the seat member and holding the seat member against the fixed clutch member, said seat member seating against the fixed clutch member to take forces transmitted to the support in one direction, and said spring means being of such strength as to overcome forces communicated to the support in the opposite directioon, said spring means also serving to maintain the seat member in adjusted position.

4. A clutch comprising in combination driving and driven members, clutch release levers, a support for each lever, a nut member screw threaded on to each support and arranged to seat against a fixed member of the clutch, said nut having an abutment for providing a face opposite the portion of the nut which seats on the fixed clutch member, and a spring locking plate secured to the fixed clutch member for engaging said abutment with tension.

5. A clutch comprising in combination driving and driven members, clutch release levers, a support for each lever, a nut member screw threaded on to each support, and arranged to rockably seat against a fixed member of the clutch, said nut having an abutment for providing a face opposite the portion of the nut which seats on the fixed clutch member, and a spring locking plate secured to the fixed clutch member for engaging said abutment with tension, said nut reacting against the fixed clutch member and spring locking plate to resist forces transmitted to the support in opposite directions.

6. A clutch comprising in combination driving and driven members, clutch release levers, a support for each lever, a nut member screw threaded on to each support and arranged to rockably seat against a fixed member of the clutch, said nut having an abutment for providing a face opposite the portion of the nut which seats on the fixed clutch member, and a spring locking plate secured to the fixed clutch member for engaging said abutment with tension, said nut reacting against the fixed clutch member and spring locking plate to resist forces transmitted to the support in opposite directions, said locking plate engaging the nut with spring tension to maintain the same in adjusted position on the support.

7. A clutch comprising in combination driving and driven members, clutch release levers, a support for each lever, a nut screw threaded on each support, said nut having an enlargement with a partially spherical formation on one side, a fixed member of the clutch having a partially spherical seat for the reception of the nut, and a spring plate fitting over the nut and secured to the said fixed member and engaging the opposite side of said enlargement, the opposite side of said enlargement being spaced from the plane of the adjacent portion of the said fixed member whereby the spring plate is under tension.

8. A clutch comprising in combination driving and driven members, clutch release levers, a clutch cover plate, said release levers having unbalanced centrifugal masses, a support to which each lever is fulcrumed, the cover plate having an aperture for each support, each support having a screw threaded portion in the aperture, a nut screw threaded upon each support and seating against the cover plate, a spring member secured to the cover plate and engaging the nut to hold it on its seat, said nut reacting against the cover plate and spring plate to overcome forces communicated to the support in opposite directions when the clutch is released and incident to the centrifugal force of the unbalanced masses.

9. A clutch comprising in combination driving and driven members, clutch release levers, a clutch cover plate, said release levers having unbalanced centrifugal masses, a support to which each lever is fulcrumed, the cover plate having an aperture for each support, each support having a screw threaded portion in the aperture, a nut screw threaded upon each support and seating against the cover plate, a spring member secured to the cover plate and engaging the nut to hold it on its seat, said nut reacting against the cover plate and spring plate to overcome forces communicated to the support in opposite directions when the clutch is released and incident to the centrifugal force of the unbalanced masses, said nuts being turnable on the screw threads to adjust the supports and levers, and the spring plates serving to hold the nuts in adjusted position.

10. A clutch comprising in combination driving and driven members, clutch release levers, a clutch cover plate, said release levers having unbalanced centrifugal masses, a support to which each lever is fulcrumed, the cover plate having an aperture for each support, each support having a screw threaded portion in the aperture, a nut screw threaded upon each support and seating against the cover plate, a spring member secured to the cover plate and engaging the nut to hold it on its seat, said nut reacting against the cover plate and spring plate to overcome forces communicated to the support in opposite directions when the clutch is released and incident to the centrifugal force of the unbalanced masses, each nut having a partially spherical surface and the cover plate having a partially spherical seat for each nut whereby to form a ball and socket type mounting for the supports.

11. A clutch comprising in combination driving and driven members, a cover plate, clutch release levers having unbalanced centrifugal masses, a support to which each lever is pivoted, the cover plate having an aperture for each support and each support having a screw threaded portion substantially in an aperture, a nut screw threaded to each support and having an enlargement seating on the outside of the cover plate, the outer shoulder formed by the enlargement being spaced from the plane of the adjacent portion of the cover plate, and a spring steel plate having its opposite ends secured to the cover plate and its intermediate portion apertured to fit over the nut and engage said enlarged portion, said steel spring plate being flexed by reason of the said shoulder being spaced from the plane of the adjacent portion of the cover plate.

12. A clutch comprising in combination driving and driven members, a cover plate, clutch release levers having unbalanced centrifugal masses, a support to which each lever is pivoted, the cover plate having an aperture for each support and each support having a screw threaded portion substantially in an aperture, a nut screw threaded to each support and having an enlargement seating on the outside of the cover plate, the outer shoulder formed by the enlargement being spaced from the plane of the adjacent portion of the cover plate, and a spring steel plate having its opposite ends secured to the cover plate and its intermediate portion apertured to fit over the nut and engage said enlarged portion, said steel spring plate being flexed by reason of the said shoulder being spaced from the plane of the adjacent portion of the cover plate, said nuts reacting against the cover plate and spring steel plates to overcome opposite forces incident to release of the clutch and centrifugal force, and said nuts being adjustable on the supports with the spring steel plates maintaining such adjustment.

13. A clutch comprising in combination driving and driven members, a cover plate, clutch release levers having unbalanced centrifugal masses, a support to which each lever is pivoted, the cover plate having an aperture for each support and each support having a screw threaded portion substantially in an aperture, a nut screw threaded on each support and accessible for turning through the aperture and having an enlargement engaging with the inside of the cover plate, the outer surface of said enlargement being spaced inwardly from the inner face of the cover plate, and a spring steel plate having its opposite ends secured to the inside of the cover plate and having an aperture through which the support extends, said steel spring plate engaging the nut and serving to hold it in adjusted position, and the steel plate and cover plate serving to overcome forces communicated to the support in opposite directions incident to clutch release and centrifugal force.

14. A clutch comprising in combination a driving member, another driving member in the form of a pressure plate shiftable axially, a cover plate, a plurality of clutch releasing levers, a support for each lever each having a connection with the cover plate, each lever being pivotally mounted to its support and pivotally connected to the pressure plate, said levers having unbalanced centrifugal masses, the connection between each support and the cover plate comprising a screw threaded portion on the support disposed in an aperture in the cover plate, a nut adjustably screw threaded on the support and having a portion seating against the cover plate, a spring member secured to the cover plate serving to hold the nut on its seat, said nut reacting against the cover plate and spring member to overcome forces in opposite directions incident to the release of the clutch and to centrifugal force, said nut rocking on its seat to permit rocking of the support to accommodate the tendency of conflicting directions of movement at the pivotal connection between lever and the pressure plate.

REINHOLD C. ZEIDLER.